No. 883,081. PATENTED MAR. 24, 1908.
H. H. BURTON.
ADDING ATTACHMENT FOR TYPE WRITERS.
APPLICATION FILED AUG. 18, 1906.

WITNESSES

INVENTOR
Henry H. Burton
BY Munn & Co.
ATTORNEYS

No. 883,081.　　　　　　　　　　　　　PATENTED MAR. 24, 1908.
H. H. BURTON.
ADDING ATTACHMENT FOR TYPE WRITERS.
APPLICATION FILED AUG. 18, 1906.
5 SHEETS—SHEET 4.

WITNESSES

INVENTOR
Henry H. Burton
BY
ATTORNEYS

No. 883,081. PATENTED MAR. 24, 1908.
H. H. BURTON.
ADDING ATTACHMENT FOR TYPE WRITERS.
APPLICATION FILED AUG. 18, 1906.

WITNESSES
INVENTOR
Henry H. Burton
BY
ATTORNEYS

UNITED STATES PATENT OFFICE.

HENRY HALLECK BURTON, OF LOS ANGELES, CALIFORNIA.

ADDING ATTACHMENT FOR TYPE-WRITERS.

No. 883,081. Specification of Letters Patent. Patented March 24, 1908.

Application filed August 18, 1906. Serial No. 331,156.

*To all whom it may concern:*

Be it known that I, HENRY HALLECK BURTON, a citizen of the United States, and a resident of Los Angeles, in the county of Los Angeles and State of California, have invented a new and Improved Adding Attachment for Type-Writers, of which the following is a full, clear, and exact description.

This invention relates to an adding attachment adapted to be secured to any common form of typewriter, and whereby columns of figures being printed by the typewriter may be automatically added and the total determined.

The adding attachment is very simple and compact and when secured to a typewriter interferes in no way with the normal operation of the machine. It may be readily removed or disconnected when not in use and when in use may be adjusted to any portion of the machine, whereby a column of figures may be added irrespective of their relative location as regards the width of the paper upon which the figures are being printed.

Reference is to be had to the accompanying drawings forming a part of this specification, in which similar characters of reference indicate corresponding parts in all the figures, in which Fig. 9 is an edge view of one of the numeral wheels; Fig. 10 is a detailed elevation of the parts shown in Fig. 11; Fig. 11 is a detailed elevation showing the means whereby each numeral wheel is returned to the zero position.

To more fully illustrate my improved adding attachment and the method in which it operates, I have shown in the drawings a portion of a typewriter, having a main frame 1, a roller 2, a carriage 3, key-bars 4, and keys 5. In the front side of the machine and back of the keys, I secure the main frame 6 of my tabulator, and movable within this frame is a frame or casing 7, carrying the numeral wheels and parts for operating the same. This frame or casing 7 is adapted to be moved along the typewriter frame simultaneously with the movement of the carriage and directly in front of the column of figures being printed upon the paper. For operating the mechanism inclosed within this casing 7, I provide a shaft 8, extending the entire length of the machine and having a plurality of arms 9 extending forward therefrom and secured thereto. Each arm 9 is preferably provided with a slot through which extends a pin $8^a$ carried by the rod 8, so that the rod must turn as the arm is depressed, but the rod is free to be turned by any one of the arms 9 without being interfered with by any other arm. Each arm is supported in its normal position by a spring $9^a$, suspended from a rod $9^b$. The front end of each of these arms is connected to one of the numeral keys of the machine in the following manner: Each numeral key-bar 4 is provided with a band 10 surrounding the same and provided at its upper end with a hook 11 adapted to engage with a link 12 secured to the end of one of the arms 9 by means of a coiled spring 13. In this manner when any of the numeral keys are struck, the lowering of the key-bar draws down upon the link 12 and coiled spring 13 to lower the end of the arm 9 and rotate the shaft 8. It is desired that the shaft 8 should be rotated a different amount for each numeral key and to permit of this I provide a stud 14 screwed into the frame and held by a lock-nut 15 directly below each of the arms 9, whereby each of these studs may have its upper end at any desired level and operate as a stop to limit the movement of the arm 9 above the same. As the numeral key-bar 4 is lowered, the arm 9 swings downward until it contacts with the stud 14 beneath the same and then further movement of the numeral key-bars is permitted due to the expansion of the coiled spring 13.

In the manner above described, it will be seen that the shaft 8 is rotated a different amount for each numeral key-bar and that the normal action of the key-bar is not interfered with in any way by having the above described mechanism attached thereto.

Figures 12, 13, 14, 15, 16, 17, 18:
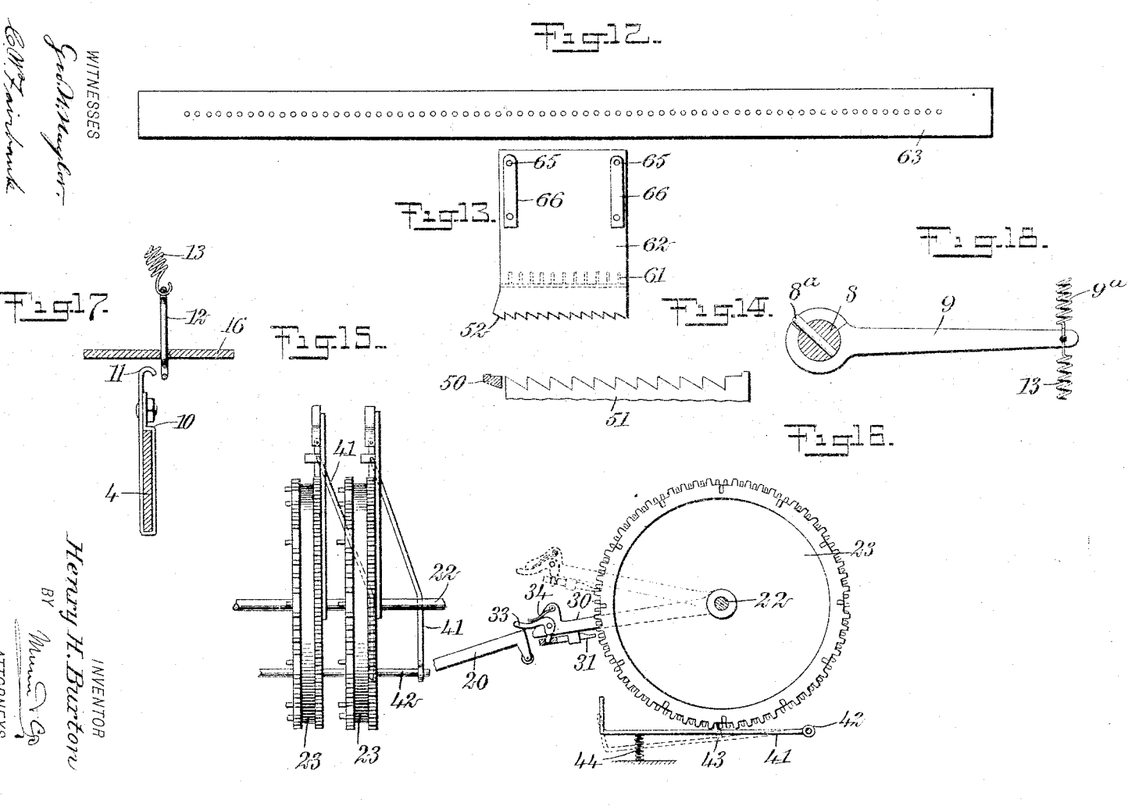
Fig. 12 is a plan view of a perforated plate carried by the typewriter carriage.
Fig. 13 is an attachment for the plate shown in Fig. 12, and by means of which the adding attachment may be moved ten points by the carriage.
Fig. 14 is a detailed view of a portion of this operating mechanism.
Fig. 15 is a plan view of two of the numeral wheels showing the means whereby each is locked in position during the rotation of the wheel of next higher denomination.
Fig. 16 is a side elevation of the parts shown in Fig. 15.
Fig. 17 is a detail showing the means whereby the adding attachment may be readily detached from the key-bars of a typewriter.
Fig. 18 is a detail showing the means of attaching the operating arms to the main shaft.

For readily detaching each of the links 12 from the key-bar secured thereto, I provide a bar 16 through which all of the links 12 pass and arrange said bar 16 in such a manner that it may be moved in an endwise direction through a limited distance. As the key-bars 4 are normally held against sidewise movement, it will be noted that by pulling on a handle 17 attached to the end of the bar 16, each and all of the links 12 may be disconnected from the hook 11 and the entire operating mechanism of the adding attachment thus separated from the typewriter.

Figure 1:
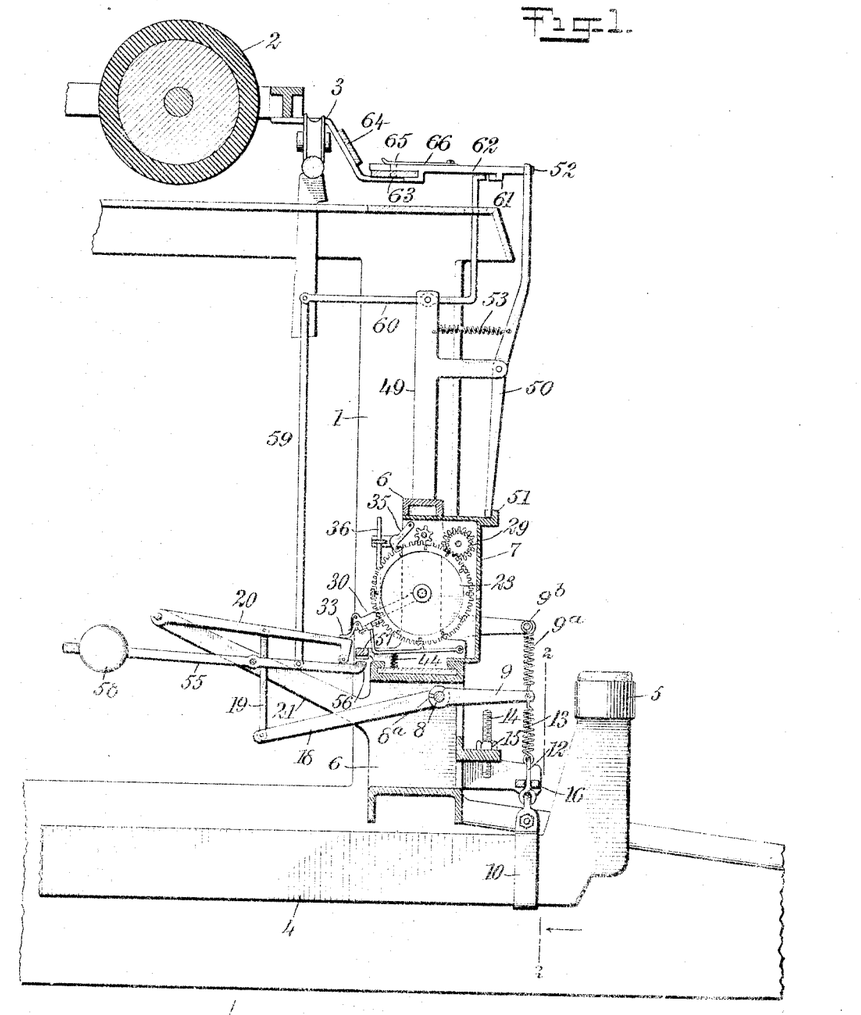
Figure 1 is a vertical section through a portion of a typewriter having my adding attachment secured thereto.
Figure 2:
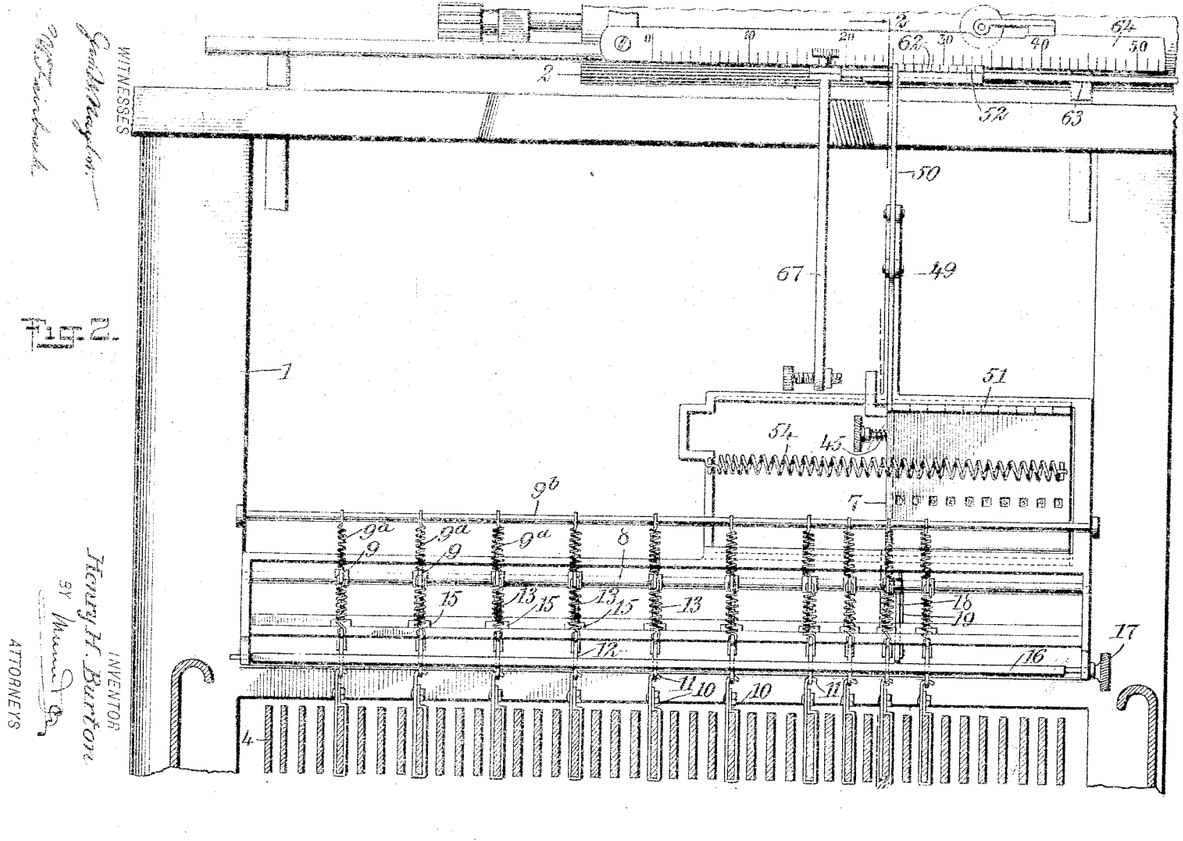
Fig. 2 is a front elevation of the parts shown in Fig. 1, a portion thereof being on the section line 2—2 of Fig. 1.

Extending backward from the shaft 8 and rigidly secured thereto, is a single lever 18 having a link 19, connected to a second lever 20 intermediate its ends and pivoted on a bracket 21 extending backward from the main frame of my adding device. By the lowering of any one of the numeral key-bars 4, it will be noted that the free end of the lever 20 may be raised, and it is through the instrumentality of this lever that the numeral wheels of the device are rotated.

Figures 3, 5:
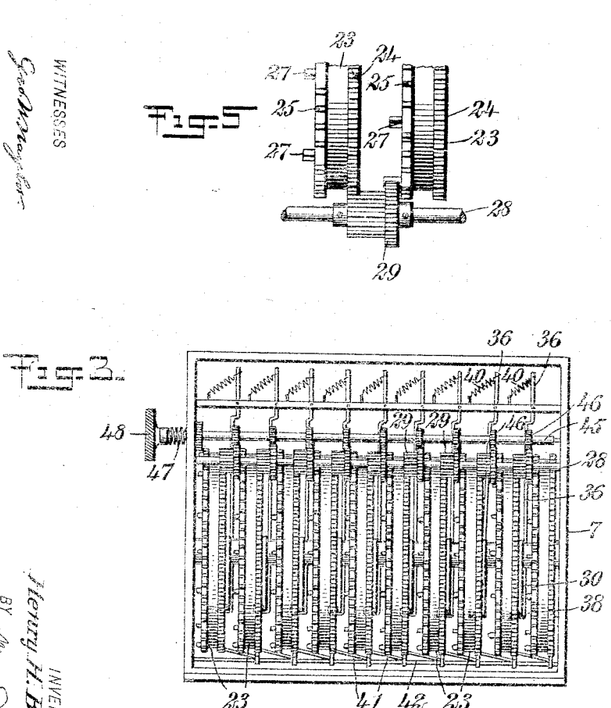
Fig. 3 is a front elevation of the numeral wheels as seen from the front, with the cover of the protecting case removed.
Fig. 5 is a detail showing the means whereby each numeral wheel is rotated one point upon the rotation of the numeral wheel of next lower denomination through ten points.

The adding device proper comprises the main casing or frame 7, having a main shaft 22 mounted in the opposite sides thereof and provided with a plurality of numeral wheels. As shown, these wheels are ten in number and the device is thus capable of adding columns of figures to show a total one less than ten billion (10,000,000,000).

Figures 5, 7:
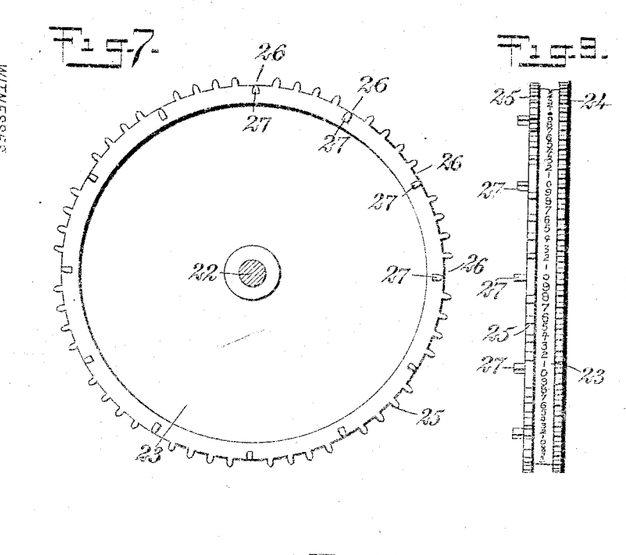
Fig. 7 is an elevation of one side of one of the numeral wheels.
Figure 6:
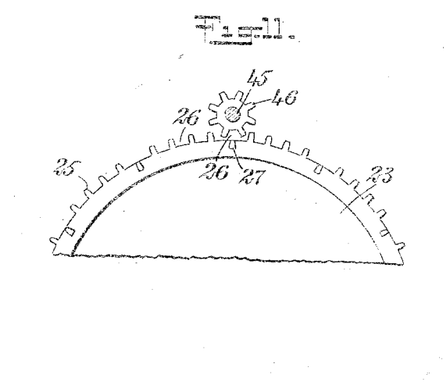
Figure 8:
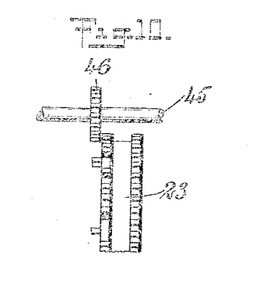
Fig. 8 is an elevation of the opposite side of the numeral wheel shown in Fig. 7.

Each numeral wheel 23 is free to rotate on the shaft 22 and is provided with a double row of teeth around its circumference. One of these rows of teeth 24 is continuous, and the number of said teeth is a multiple of ten. The second row of teeth 25 is spaced twice as far apart as are the teeth in the first mentioned row and every fifth tooth, corresponding to every tenth tooth in the other row 24, is omitted from the outer circumference, leaving a plurality of gaps 26 each equivalent to the width of three teeth in the row 24. On the face of the numeral wheel there are provided a plurality of teeth 27, extending in the direction of the axis of the wheel, and which are located opposite the gaps 26 in the row 25. The teeth 27 are thus spaced opposite every tenth tooth of the continuous row 24, and it is by means of these side teeth 27 that each wheel is rotated one point as each wheel of the next lower denomination is rotated ten points. On the outer circumference of each numeral wheel is arranged a series of figures running from 0 to 9, and the distance between said figures is exactly equal to the distance between the teeth of the continuous row 24, whereby as said wheel is rotated, the numerals may be caused to pass in front of a suitable window or opening in the protecting casing and the extent to which the wheel is rotated may be observed.

For causing the intermittent rotation of one wheel during the rotation of the wheel of next lower denomination, I provide the means, a detail of which is shown in Fig. 5. This means comprises a shaft 28 having a plurality of pinions 29 mounted for independent rotation thereon. Each of these pinions has one end thereof meshing with the continuous row of teeth 24 on one of the numeral wheels, and has the other end somewhat larger and extending adjacent the wheel of next lower denomination, whereby it may engage with the side teeth 27. The size of the pinions is so regulated that as a numeral wheel is rotated and a side tooth engages with a pinion 29, it will only remain in engagement therewith for a sufficient length of time to cause the rotation of the next adjacent numeral wheel in which the pinion is in engagement, through a single point or a distance equivalent to the width of a single tooth of the continuous row. The side tooth 27 may then pass on and the pinion 29 and the numeral wheel of next higher denomination will remain stationary until the next side tooth 27 contacts with the pinion 29 and causes the numeral wheel of next higher denomination to rotate through another point.

Figures 4, 6:
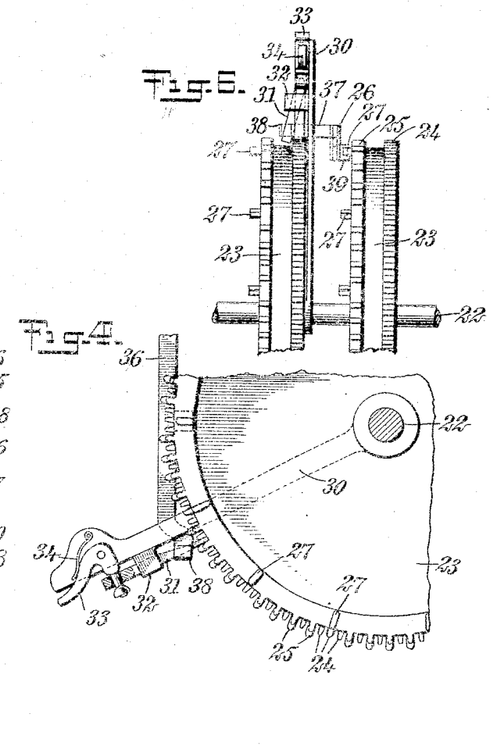
Fig. 4 is a detailed view showing the mechanism by which the numeral wheels are turned.
Fig. 6 is a detail showing the means whereby each numeral wheel is unlocked at each ten points in the rotation of a numeral wheel of the next lower denomination.
Figure 4:
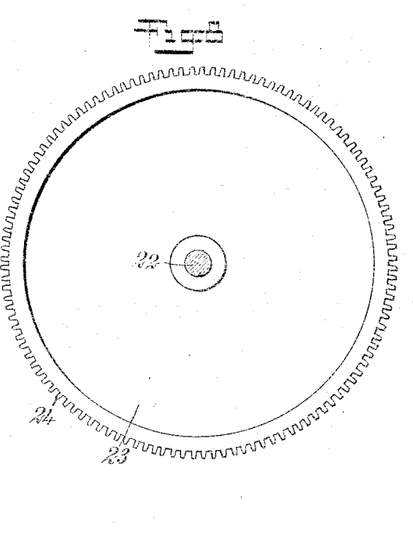

For rotating the numeral wheels as the keys of the typewriter are operated, I provide a plurality of arms 30, pivoted to the shaft 22 adjacent each of the said numeral wheels, and the outer end of each of these arms is provided with a pawl 31, adapted to engage with the continuous row of teeth on the adjacent numeral wheel. This pawl is supported in a slotted bracket 32 on the under side of the arm 30 and has its outer end perforated for the insertion of one end of a bell crank lever 33, normally held down by a spring 34. There are as many of these arms as there are numeral wheels. As the tabulator moves across the typewriter frame simultaneously with the movement of the carriage, each of the pawls 33 on the arms 30 is brought in succession over the end of the lever 20. As the key is struck the lever 20 is raised and a slight pressure exerted on the end of the bell crank lever 33, causes the withdrawal of the pawl from engagement with the continuous row of teeth on the numeral wheel. Further upward movement of the lever 20 causes the arms 30 to swing upward on the shaft 22, as a center until the limit of movement is reached, said limit being determined by the length of the stud beneath the arm 9 of the particular key which is pressed downward. As the lever 20 is lowered by the return of the typewriter key, the pressure on the bell crank lever 33 is withdrawn and the pawl 31 instantly engages the teeth of the numeral wheel, and the weight of said lever is sufficient to cause the rotation of said wheel. As the extent to which the arm 33 is raised is dependent upon which of the typewriter keys is operated, it is evident that the wheel may be rotated varying amounts through the employment of but a single lever 20. To prevent the wheel from accidentally rotating in a wrong direction due to the pawl 31 remaining in engagement with the teeth, or due to any other causes, I provide a suitable dog 35 on the upper side of the wheel and in engagement with the continuous row of teeth, whereby the wheel may freely rotate in one direction but is prevented from rotating in the other direction.

As the pawl 31 is in contact with its numeral wheel at all times, save when the arm 30 is being raised, each of said wheels are thus locked in position and prevented from accidental rotation. As each wheel is rotated one point by the pinion 29 for each ten points which the wheel of next lower denomination rotates, it is necessary to intermittently unlock each wheel as the one of lower denomination passes the zero point. To accomplish this, I provide a plurality of bars 36, pivotally secured in the upper part of the tabulator casing, and each suspended adjacent the rear of each of the numeral wheels. Each of the bars 36 has its lower end 37 bent at an angle and provided with an open-topped pocket or recess 38 adapted to receive the pawl 31 when the arm 30 is in its normal position. Each of the bars 30 is provided with an inclined lug 39, intermediate its ends and so located that the side teeth 27 of the adjacent wheel contacts therewith at the same time that another side tooth 27 on the same wheel comes into engagement with a pinion 29. Further movement of the numeral wheel and its side tooth 27 forces the bar 36 and its lug 39 out of alinement and the recesses 38 on the lower end of the bar pushes the pawl sidewise into the slot of the bracket 32, and thus moves the said pawl out of engagement with the continuous teeth of its numeral wheel. This permits the latter numeral wheel to be rotated one point by the pinion 29, and further movement of this wheel is prevented by the return of the bar 36 to its vertical position and the return of the pawl 31 into engagement with the continuous teeth, as the side tooth 27 moves past the lug on the said bar. The bars 36 are normally held in a vertical position by springs 40 adjacent their upper ends.

For effectively preventing the accidental rotation of any wheel during the rotation of the wheel of next higher denomination, I provide a plurality of arms 41, each pivoted on a shaft 42 and having a lug or tooth 43 intermediate its ends and adapted to engage with the continuous teeth on the under side of a numeral wheel. The end of the arm extends a considerable distance beyond said lug 43 and is bent over to contact with the under side of arm 30 of the next adjacent wheel of lower denomination. When this arm is at rest it forces the lug out of engagement with the teeth in opposition to the action of a spring 44, and thus none of the wheels are normally locked at this point, but as soon as any one of the arms 30 is raised, an arm 41 may also raise and its lug 43 will come into engagement with the teeth on the under side of the numeral wheel of next lower denomination and effectively prevent its accidental rotation.

The casing of the adding device also carries a shaft 45, supported within the same and provided with a plurality of pinions 46 rigidly secured thereto, one pinion for each of the numeral wheels. These pinions are normally out of engagement with the numeral wheels and occupy the relative position thereto indicated in Fig. 10, namely, adjacent the side of the numeral wheel on which the intermittent row of teeth are located. The shaft 45 is capable of longitudinal movement and is normally held in one extreme position by a spring 47 adjacent the operating handle 48.

When a column of figures has been printed on the paper and the result noted on the numeral wheels, and it is desired to write a new column, the handle 48 is pushed in and each of the pinions 46 is brought into engagement with its numeral wheel. Upon rotating the shaft 45 and its pinions all of the numeral wheels will be rotated until one of the gaps 26 of each wheel comes adjacent the pinion, as indicated in Fig. 11. Further rotation of any numeral wheel is thus prevented, as the pinions 46 can rotate freely at this point without rotating the numeral wheels. The shaft 45 and its pinions are located at such a point on the circumference of a set of numeral wheels that when a gap 26 of each of the numeral wheels is opposite its corresponding pinion 46, the zero on that numeral wheel will be opposite its small window in the frame or casing 7 inclosing the numeral wheels.

In the manner above described, each of the numeral wheels 23 is rotated to the extent permitted by the particular key on the typewriter which is struck, and the manner in which these wheels are maintained in their normally locked position, how each wheel upon rotating ten points rotates the next adjacent wheel one point, and how the wheels are again set at zero, has been fully set forth.

In order that the operation of the device may be complete, it is necessary that the casing 7, inclosing the numeral wheels, be moved along the typewriter frame simultaneously with the movement of the typewriter carriage as the figures are printed on the paper. To accomplish this, I mount the casing 7 in an opening in the frame 6 and so arranged that it may slide in a longitudinal direction and thus bring each of the arms 30 for rotating the wheels, over the lever 20. The frame 6 is provided with an upwardly-extending arm 49, having a lever 50 pivoted to a branch of the same. This lever has its lower end in engagement with a ratchet bar 51 mounted on the casing 7, and has its upper end in engagement with a similar ratchet bar 52, carried by the typewriter carriage and facing in an opposite direction to the ratchet bar 51. This lever 50 is normally held in engagement with both ratchet bars by a spring 53, whereby the casing 7 inclosing the numeral wheels 23, is held stationary while the carriage is at rest. The casing 7 is provided with a coiled spring 54, normally tending to draw the casing in the same direction that the carriage moves during the operation of the typewriter, namely, from right to left. The casing, when at is extreme position, to the right, has one of the arms 30 of a left-hand numeral wheel 23 in engagement with the lever 20, whereby if any numeral key of the typewriter is struck, the left-hand numeral wheel will be rotated a number of points equal to the number carried by said numeral key. As the key of the typewriter is struck, its numeral is printed on the paper carried by the typewriter carriage and the carriage moves one point to the left by means of the usual mechanism not shown. As the typewriter carriage moves, the ratchet bar 52 carried thereby forces the end of the lever 50 outward and into the next notch in said ratchet bar. This outward movement of the upper end of the lever 50 results in a corresponding inward movement of the lower end of said lever and the spring 54 is permitted to pull said casing 7 one notch to the left. Longitudinal movement of the adding device through more than one space at a time is prevented by the engagement of the inner end 56 of the lever 55 with the series of teeth 57 on the under side of the casing 7. The lever is normally out of engagement with the teeth but is brought into engagement therewith each time a numeral key is operated. The exact distance moved by the carriage and the tabulator casing need not necessarily be the same as the distance of the first depends upon the space between the letters as printed upon the paper, while the distance traveled by the second depends upon the distance between the numeral wheels 24 and their corresponding arms 30. If now a numeral key is struck, the numeral carried thereby will be printed on the paper adjacent the one last printed and the numeral wheel adjacent the left-hand one will be rotated a number of points corresponding to the number carried by the key. In this manner the tabulator casing moves step by step to the left, and the striking of the keys in succession and the printing of a number having a plurality of digits, results in the recording of this number on the several numeral wheels within the tabulator casing. The tabulator casing, as shown, contains but ten numeral wheels; but it is evident that any number of wheels may be provided, depending upon the size of the numbers being printed.

To prevent the sudden movement of the casing 7 through more than one point when a key is struck, I provide a locking mechanism adapted to hold the casing from such freedom of motion. Pivoted to the arm 21 of the frame 6 is a lever 55, having one end 56 adapted to engage with a series of teeth 57 on the under side of the casing 7, while said lever is normally held out of engagement with said teeth by the weight of the free end of the lever 20. As said lever 20 is raised by the link 19 and arm 18, a ball 58 on the opposite end of the lever 55 forces the end 56 in engagement with said teeth and limits the movement thereof. The lever 55 carries a link 59, pivoted to a second lever 60, having its end adapted to engage with a series of teeth 61 on the under side of a plate 62, having the ratchet 52 above referred to, and which is secured to the typewriter carriage. The teeth 57 and 61 are both comparatively fine and the space between said teeth is comparatively great, so that as soon as the typewriter key is struck, the lever end 56 enters the teeth 57 and positively locks the casing against any longitudinal movement whatever, while the end of the lever 60 enters the opposite side of a small tooth and does not interfere with the movement of the typewriter carriage through a single space. After the type strikes the paper on the roller 2 and pressure is removed from the key, the typewriter carriage moves a single step, and until the end of the lever 60 contacts with the next tooth of the series 61. When the key is returned to its normal position, the lever end 56 is freed from engagement with the teeth 57 and the spring 54 is permitted to draw the casing of the attachment one space controlled by the lever 50 and its engagement with the ratchet bars 51 and 52.

As it is sometimes desired to print a column of figures down one portion of a sheet of paper and at other times to print it upon other portions of the paper, it is necessary that the relative positions of the typewriter carriage and of the casing of the attachment be varied. To accomplish this, I provide the typewriter carriage with a long plate 63 of substantially the same length as the scale 64 on the carriage, but as the casing is located at one side of the center of the machine, the plate 63 is located with one end thereof substantially even with the 25-mark on the scale. This plate 63 is provided with a series of holes, the same distance apart as the points on the scale, and the plate 62 having the teeth 61 and ratchet 52 is secured to this plate by means of a plurality of pins 65 carried by springs 66 on the upper face of the plate. The plate 62 is placed at any desired position along the length of the plate 63 and the springs 66 hold the pins 65 in the holes of the plate and secure the latter in place. The position of the plate may be varied at will and with but very little trouble. When the plate 62 is secured to the plate 63, adjacent its left-hand end, it will have its left-hand tooth in engagement with the end of the lever 50, when the carriage is moved to its extreme position and the column of figures will be printed adjacent the left-hand side of the paper.

If it is desired that a column of figures be printed down through the center of a sheet of paper, the plate 62 is shifted to a position adjacent the center of the plate 63 and if the carriage be moved to the extreme right any subject matter desired may be printed on the paper without interfering with the tabulating attachment, but when the typewriter attachment has traveled the required distance for the ratchet bar 52 on the plate 62 to come into engagement with the lever 50, then if a numeral key be struck, the corresponding numeral will appear on the left-hand numeral wheel.

For automatically returning the tabulator casing 7 to its operating or right-hand position, I may provide the typewriter carriage with any suitable bar or bracket 67 extending downward therefrom and engaging with an end of the casing 7, whereby as the typewriter carriage approaches its right-hand position the bar or bracket 67 engages with the tabulator casing 7 and forces it also to its right-hand position.

It is possible for an operator to write so rapidly that the arm 20 would not have time to descend to its normal position before the next key of the machine is depressed, and it will be noted that in my machine this is prevented by having the teeth 57 so placed on the bottom of the casing that the casing is allowed to move only enough to the left to enable the arm 20 to descend in the space between the two adjacent levers 30. When the arm 20 has reached its lowest limit and forced the arm 56 out of engagement with the teeth, then the tabulator casing 7 is allowed to complete its movement and bring the next lever 30 over the arm 20; so also with the teeth 61, which are so placed on the bottom of the plate 62 that the typewriter carriage is allowed to move to the left only a small fraction of its total movement. It is held in that position until the arm 20 is at its lowest position. By arranging the teeth 57 and 61 in this way, there is no chance of two figures being added on the same numeral wheel. If the operator is too rapid, he will simply raise the arm 20 between two of the levers 30 and print figures one nearly on top of the other on the paper but there will be no error in the addition.

Various changes may be made in the construction of the machine as will be very evident. The adding attachment may be fastened to any part of the typewriter frame, on the outside, on either end, or on the inside as shown in the drawings; as many styles of typewriters do not have enough space within the frame above the keyboard to fasten the attachment in the manner illustrated. It is not essential that the casing 7 should be directly in front of the column of figures to be added, as by extending the shaft 8 beyond the typewriter frame and putting the plate 63 in the proper position, the attachment can be worked at either end of the typewriter, but this arrangement is to be avoided if possible, for the reason that as it extends beyond the machine, it is more liable to be injured than the more compact form shown in the drawings.

By omitting a tooth in the plate 61, the decimal point (.) may be printed by the typewriter without resulting in the lateral movement of the tabulator casing and by leaving a space between certain of the teeth on the ratchet 52, the typewriter carriage may be moved any distance independently of the attachment.

Having thus described my invention, I claim as new and desire to secure by Letters Patent:

1. In combination with a typewriter having a carriage, an adding device adapted to be attached thereto, said adding device comprising a plurality of numeral wheels, a shaft upon which said wheels are mounted, an arm pivoted to said shaft adjacent each wheel, and means adapted to engage with said levers in succession to rotate said wheels.

2. In combination with a typewriter having a carriage, an adding device adapted to be attached thereto, said adding device comprising a plurality of numeral wheels, a shaft upon which said wheels are mounted, an arm pivoted to said shaft adjacent each wheel, means for rotating each numeral wheel when its corresponding arm is moved in one direction, and means adapted to engage with said arms in succession to rotate said wheels.

3. In combination with a typewriter having a carriage, an adding device adapted to be attached thereto, said adding device comprising a plurality of numeral wheels, a shaft upon which said wheels are mounted, a plurality of arms pivoted to said shaft, one arm being adjacent each wheel, means adjacent the end of each arm for engaging with the corresponding wheel for rotating the same when the arm is moved in one direction, means for preventing the rotation of the wheels when the arms are moved in the opposite direction, and means adapted to engage with said arms in succession to rotate said wheels.

4. In combination, a plurality of numeral keys, a shaft, a plurality of wheels on said shaft, a lever arm pivoted on said shaft and adjacent each of said numeral wheels, means connected to said keys and adapted to operate said levers, and means for moving the numeral wheels in respect to said operating means, whereby any one of the levers may be operated to rotate its corresponding wheel.

5. In combination, a typewriter having a carriage, a plurality of numeral keys, an adding device attached thereto, means for moving said adding device each time a numeral key of the typewriter is operated, and means attached to the typewriter carriage for controlling the movement of the adding device, said means comprising a ratchet bar on said carriage, a second ratchet bar on the adding device, and a lever in engagement with both of said ratchet bars.

6. In combination with a typewriter having a movable carriage, an adding device movable in the same direction as the carriage, a ratchet bar carried by the carriage, a ratchet bar carried by the adding device, and means coöperating with said ratchet bars for permitting the movement of the adding device simultaneously with the movement of the typewriter carriage.

7. In combination with a typewriter having a carriage movable thereon, a plate carried by said carriage and longitudinally adjustable in relation thereto, an adding device movable in respect to the typewriter, and means coöperating with the plate and the adding device for permitting the simultaneous movement of the two in the same direction said means comprising a lever pivoted intermediate its ends and having its ends in engagement with said plate and said adding device.

8. In combination, a plurality of numeral keys, a shaft adapted to be oscillated at different amounts by each of said keys, a plurality of numeral wheels, a pivoted arm corresponding to each wheel, means adapted to engage with one of said pivoted arms to cause the rotation of the corresponding wheel, and means for moving said arms in succession into operative engagement with said last mentioned means.

9. In combination, a plurality of numeral keys, a shaft adjacent thereto, means connecting each of said keys to said shaft, whereby the shaft may be rotated different amounts during the operation of each of said keys, a plurality of numeral wheels, a pivoted arm supported adjacent each of said numeral wheels, means connected to said shaft and adapted to raise one of said pivoted arms upon the oscillation of said shaft, and means whereby said pivoted arms may be operated in succession upon the successive operation of said numeral keys.

10. An adding device, comprising a suitable casing, a shaft supported in said casing, a plurality of numeral wheels supported on said shaft, a lever arm pivoted on said shaft, adjacent each of said numeral wheels, means for raising each of said lever arms in succession, and means carried by each of said lever arms whereby it may be moved one direction independent of its numeral wheel, but whereby it is locked to said numeral wheel during movement of the opposite direction.

11. An adding machine, comprising a plurality of wheels, a lever arm adjacent each of said wheels and adapted to rotate the same, means for rotating each of said wheels a definite distance upon the movement of the adjacent wheel through a distance ten times as great, means for locking each of said lever arms to its wheel, and means for momentarily unlocking each wheel during its movement by the adjacent wheel.

12. An adding machine, comprising a plurality of numeral wheels, each of said wheels having a continuous row of teeth around the circumference thereof, a tooth extending from the side of said wheel adjacent every tenth tooth on the circumference thereof, means normally engaging the continuous row of teeth for rotating the same, means adapted to coöperate with each of said wheels for independently operating the next adjacent wheel, and means adapted to contact with said side teeth for disengaging the pawl from the adjacent wheel and permitting the intermittent rotation of the latter by the means above referred to.

13. An adding machine, comprising a plurality of numeral wheels, each of said wheels having a continuous row of teeth around the circumference thereof, a tooth extending from the side of said wheel adjacent every tenth tooth on the circumference thereof, independent means adapted to rotate each of said wheels, means for normally locking said rotating means to said wheels, means adapted to coöperate with said side teeth and the continuous row of teeth on the adjacent wheel for intermittently rotating one wheel during the rotation of the adjacent wheel, and means adapted to coöperate with said side teeth for unlocking each wheel from its independent operating means to permit of its intermittent operation.

14. An adding machine, comprising a plurality of numeral wheels, each having a continuous row of teeth around the circumference thereof, a row of numerals adjacent said teeth and corresponding in number thereto, an intermittent row of teeth around the circumference of each of said wheels, a row of side teeth on each of said wheels, the distance between said teeth being equal to the distance between ten of the teeth on the continuous row, means adapted to contact with the continuous row of one wheel and the side teeth of the adjacent wheel for rotating the former a space of one tooth as the latter rotates to the space of ten teeth, and means adapted to coöperate with the intermittent row of teeth to rotate each of said wheels until the gaps in the intermittent rows of all of said wheels are in alinement.

15. In combination, a plurality of numeral wheels, each having a continuous row of teeth, and an intermittent row of teeth, the gaps in said intermittent row occurring opposite each tenth tooth in the continuous row, a shaft mounted adjacent said wheels, a plurality of pinions fixed thereto, and means whereby upon the movement of said shaft each of said pinions is brought into engagement with the intermittent row of teeth on one of said wheels, and whereby upon the rotation of said shaft each of said numeral wheels is rotated until a gap in the intermittent row of teeth comes adjacent the operating pinion of said wheel.

16. In combination, a plurality of numeral wheels, a shaft supported adjacent thereto, a plurality of levers mounted thereon, a tooth on each of said levers adapted to engage with a corresponding numeral wheel, means connected with each of said numeral wheels for rotating the same, and means whereby the movement of said rotating means of one wheel permits the engagement of the tooth of a lever with the adjacent wheel for positively locking the latter in position.

17. In combination with a plurality of numeral keys, a shaft, a plurality of arms mounted on said shaft and corresponding in number with said numeral keys, resilient means connecting each of said arms with its corresponding numeral key, independent stops for limiting the movement of each arm, and resilient means for returning each arm to its original position after having been operated by the numeral key.

18. In combination with a plurality of numeral keys, a shaft, arms mounted thereon and movable relatively thereto, stops carried by said shaft for limiting the movement of said arms in respect thereto, resilient means connecting one end of each of said arms to its corresponding numeral key, and stops adapted to engage with each of said arms intermediate its ends for limiting its movement.

19. In an adding machine, a plurality of numeral wheels, operating means for independently rotating the same, means for intermittently rotating one wheel by the rotation of another wheel, each of said wheels having a row of teeth, the space between two of the adjacent teeth being greater than the distance between the other pairs of adjacent teeth, a longitudinally movable shaft mounted adjacent said wheels, a plurality of pinions rigid therewith, resilient means for moving said shaft longitudinally in one direction to normally hold said pinions out of engagement with said teeth, and manually controlled means for moving said shaft longitudinally in the other direction to bring the pinions into engagement with the rows of teeth of said wheels, whereby upon the rotation of said shaft, each of said wheels is rotated until the gap in its row of teeth comes adjacent the corresponding operating pinion.

20. In combination, a plurality of numeral keys, a shaft supported adjacent thereto, a plurality of arms secured to said shaft, resilient means for connecting each of said arms to its corresponding numeral key, and a longitudinally movable bar in engagement with each of said resilient means for simultaneously disconnecting all of the arms from their corresponding keys.

21. In an adding machine, a plurality of wheels, means for rotating the same, each of said wheels having a row of teeth, a lever arm pivoted adjacent each of said wheels and adapted to rotate the same, a pawl carried by each of said levers and in engagement with the teeth of the respective wheels, a bar in engagement with each of said pawls, means whereby each of said wheels is rotated intermittently during the rotation of the adjacent wheel, and means carried by each of said wheels for engagement with the bar of the adjacent wheel to move its pawl out of engagement with the teeth and permit of said intermittent rotation.

22. In an adding machine, a plurality of wheels, each having a circumferential row of teeth, means for rotating said wheels, said means including a pawl in engagement with said teeth; means whereby each wheel is rotated intermittently during the rotation of an adjacent wheel, and means adapted to be operated by each of said wheels for moving laterally the pawl of the adjacent wheel to permit of said intermittent rotation.

In testimony whereof I have signed my name to this specification in the presence of two subscribing witnesses.

HENRY HALLECK BURTON.

Witnesses:
SAMUEL M. STORER,
H. R. STONE.